(12) United States Patent
Klosinski et al.

(10) Patent No.: US 8,429,978 B2
(45) Date of Patent: Apr. 30, 2013

(54) RESONANT FREQUENCY BASED PRESSURE SENSOR

(75) Inventors: Andrew J. Klosinski, Waconia, MN (US); Charles R. Willcox, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 412 days.

(21) Appl. No.: 12/749,885

(22) Filed: Mar. 30, 2010

(65) Prior Publication Data
US 2011/0239773 A1    Oct. 6, 2011

(51) Int. Cl.
  *G01L 9/12*     (2006.01)
  *G01L 15/00*    (2006.01)
(52) U.S. Cl.
  USPC .................................. 73/724; 73/716; 73/718
(58) Field of Classification Search ............ 73/715–718, 73/723–724
  See application file for complete search history.

(56) References Cited

U.S. PATENT DOCUMENTS

| | | | |
|---|---|---|---|
| 2,533,339 A | 12/1950 | Willenborg | 177/311 |
| 3,012,432 A | 12/1961 | Moore et al. | 73/40 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,410,135 A | 11/1968 | Reynaud | |
| 3,557,621 A | 1/1971 | Ferran | 117/226 |
| 3,618,390 A | 11/1971 | Frick | |
| 3,697,835 A | 10/1972 | Satori | 317/246 |
| 3,808,480 A | 4/1974 | Johnston | 317/256 R |
| 3,924,219 A | 12/1975 | Braun | 338/34 |
| 4,008,619 A | 2/1977 | Alcaide et al. | 73/398 |
| 4,120,206 A | 10/1978 | Rud, Jr. | 73/718 |
| 4,158,217 A | 6/1979 | Bell | 361/283 |
| 4,168,518 A | 9/1979 | Lee | 361/283 |
| 4,177,496 A | 12/1979 | Bell et al. | 361/283 |
| 4,227,419 A | 10/1980 | Park | 73/724 |

(Continued)

FOREIGN PATENT DOCUMENTS

| | | |
|---|---|---|
| DE | 1932899 A1 | 1/1971 |
| DE | 3340834 | 5/1985 |

(Continued)

OTHER PUBLICATIONS

Notification of Transmittal of the International Search Report and the Written Opinion of the International Searching Authority, or the Declaration for PCT/US2011/038688 filed Jun. 1, 2011 and mailing date Jul. 22, 2011, 10 pages.

(Continued)

*Primary Examiner* — Lisa Caputo
*Assistant Examiner* — Jonathan Dunlap
(74) *Attorney, Agent, or Firm* — Westman, Champlin & Kelly, P.A.

(57) ABSTRACT

A pressure sensor for sensing a pressure of a process fluid includes a sensor body exposed to the pressure of the process fluid. The sensor body deforms in response to the pressure. A diaphragm suspended from the sensor body has a tension which changes in response to deformation of the sensor body. A resonate frequency of the diaphragm is measured. The measured resonant frequency is indicative of the line pressure of the process fluid and integrity of the isolation fill fluid system. In addition to measuring the resonant frequency, the oscillation mode itself can be used as a diagnostic tool to assess sensor health.

19 Claims, 5 Drawing Sheets

U.S. PATENT DOCUMENTS

| | | | |
|---|---|---|---|
| 4,244,226 A | 1/1981 | Green et al. | 73/703 |
| 4,287,553 A | 9/1981 | Braunlich | 361/283 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,370,890 A | 2/1983 | Frick | 73/718 |
| 4,389,895 A | 6/1983 | Rud, Jr. | 73/724 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,466,290 A | 8/1984 | Frick | 73/756 |
| 4,490,773 A | 12/1984 | Moffatt | 361/283 |
| 4,542,436 A | 9/1985 | Carusillo | 361/283 |
| 4,562,742 A | 1/1986 | Bell | 73/718 |
| 4,586,108 A | 4/1986 | Frick | 361/283 |
| 4,586,382 A | 5/1986 | Sinha | 73/703 |
| 4,604,901 A | 8/1986 | Kagi | |
| 4,623,813 A | 11/1986 | Naito et al. | |
| 4,670,733 A | 6/1987 | Bell | 338/36 |
| 4,739,666 A | 4/1988 | Hafner et al. | |
| 4,785,669 A | 11/1988 | Benson et al. | 73/718 |
| 4,860,232 A | 8/1989 | Lee et al. | 364/571.04 |
| 4,864,874 A | 9/1989 | Hafner | |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283 |
| 4,977,480 A | 12/1990 | Nishihara | 361/283 |
| 5,012,677 A | 5/1991 | Shimada et al. | |
| 5,094,109 A | 3/1992 | Dean et al. | |
| 5,144,841 A | 9/1992 | Brouwers et al. | |
| 5,168,419 A | 12/1992 | Delatorre | 361/283 |
| 5,194,819 A | 3/1993 | Briefer | 324/684 |
| 5,230,250 A | 7/1993 | Delatorre | 73/733 |
| 5,233,875 A | 8/1993 | Obermeier et al. | 73/718 |
| 5,291,795 A | 3/1994 | Hafner | |
| 5,329,818 A | 7/1994 | Frick et al. | 73/708 |
| 5,469,749 A | 11/1995 | Shimada et al. | 73/861.47 |
| 5,471,882 A | 12/1995 | Wiggins | 73/702 |
| 5,492,016 A | 2/1996 | Pinto et al. | 73/724 |
| 5,524,492 A | 6/1996 | Frick et al. | 73/706 |
| 5,531,120 A | 7/1996 | Nagasu et al. | |
| 5,542,300 A | 8/1996 | Lee | 73/724 |
| 5,624,760 A | 4/1997 | Collins et al. | |
| 5,635,649 A | 6/1997 | Tobita et al. | 73/717 |
| 5,637,802 A | 6/1997 | Frick et al. | 73/724 |
| 5,642,301 A | 6/1997 | Warrior et al. | 364/571.02 |
| 5,705,978 A | 1/1998 | Frick et al. | 340/511 |
| 5,757,608 A | 5/1998 | Bernot et al. | 361/283.4 |
| 5,760,310 A | 6/1998 | Rud, Jr. et al. | 73/706 |
| 5,911,162 A | 6/1999 | Denner | 73/718 |
| 5,920,016 A | 7/1999 | Broden | 73/756 |
| 5,992,240 A | 11/1999 | Tsuruoka et al. | 73/718 |
| 6,003,219 A | 12/1999 | Frick et al. | |
| 6,151,967 A * | 11/2000 | McIntosh et al. | 73/718 |
| 6,279,401 B1 | 8/2001 | Karas | 73/716 |
| 6,295,875 B1 | 10/2001 | Frick et al. | 73/718 |
| 6,484,585 B1 | 11/2002 | Sittler et al. | 73/718 |
| 6,520,020 B1 | 2/2003 | Lutz et al. | 73/706 |
| 6,654,697 B1 | 11/2003 | Eryurek et al. | 702/47 |
| 6,662,662 B1 | 12/2003 | Nord et al. | 73/715 |
| 6,675,655 B2 | 1/2004 | Broden et al. | 73/716 |
| 6,701,274 B1 | 3/2004 | Eryurek et al. | 702/140 |
| 7,334,484 B2 | 2/2008 | Harasyn et al. | 73/718 |
| 7,401,522 B2 | 7/2008 | Broden et al. | |
| 7,415,886 B2 * | 8/2008 | Schumacher et al. | 73/718 |
| 7,467,555 B2 | 12/2008 | Schulte et al. | 73/736 |
| 7,484,416 B1 | 2/2009 | Klosinski et al. | 73/718 |
| 7,543,501 B2 | 6/2009 | Cottles et al. | |
| 7,779,698 B2 | 8/2010 | Willcox | 73/716 |
| 7,870,791 B2 * | 1/2011 | Hedtke et al. | 73/756 |
| 7,954,383 B2 * | 6/2011 | Willcox et al. | 73/718 |
| 2002/0178827 A1 | 12/2002 | Wang | 73/718 |
| 2004/0015069 A1 | 1/2004 | Brown | 600/407 |
| 2004/0168523 A1 | 9/2004 | Fernald et al. | 73/861.01 |
| 2005/0005712 A1 | 1/2005 | Gysling et al. | 73/861.23 |
| 2005/0011278 A1 | 1/2005 | Brown et al. | 73/861.18 |
| 2005/0041375 A1 | 2/2005 | Rosenau | |
| 2005/0132808 A1 | 6/2005 | Brown et al. | 73/592 |
| 2006/0206288 A1 | 9/2006 | Brahmajosyula et al. | 702/183 |
| 2006/0278005 A1 | 12/2006 | Broden et al. | 73/716 |
| 2006/0278007 A1 | 12/2006 | Harasyn et al. | 73/723 |
| 2009/0078054 A1 | 3/2009 | Romo | 73/717 |
| 2010/0000326 A1 * | 1/2010 | Guo | 73/724 |
| 2010/0132472 A1 * | 6/2010 | Willcox et al. | 73/718 |
| 2011/0239773 A1 | 10/2011 | Klosinski et al. | 73/724 |

FOREIGN PATENT DOCUMENTS

| | | |
|---|---|---|
| DE | 3820878 | 6/1988 |
| EP | 0524550 | 1/1993 |
| WO | WO00/70321 | 11/2000 |
| WO | WO 2006/130425 | 12/2006 |

OTHER PUBLICATIONS

Notice of Notification for Correction for Chinese Patent Application No. 201120094632.0 dated Aug. 9, 2011; 9 pages.

Saturn Line Pressure Sensor Concept, "A Different Way of Getting a Line Pressure Signal From the Saturn Sensor", Rosemount, Saturn LP Concept, Sep. 15, 2008.

International Search Report and Written Opinion of the International Searching Authority for PCT/US2006/019955.

Notification of Transmittal of the International Search Report and the Written Opinion of the International Searching Authority, or the Declaration for PCT/US2006/019955.

Notification of Transmittal of the International Search Report and the Written Opinion of the International Searching Authority, or the Declaration for PCT/US2011/026965 filed Mar. 3, 2011, date of mailing Jul. 12, 2011, 12 pages.

Formal Russian Office Action (with English translation) for Russian Application No. 2012146107, dated Nov. 19, 2012, 4 pages.

* cited by examiner

MODES WITH AZIMUTHAL SYMMETRY

ASYMMETRIC MODES WITH ZERO NET VOLUME DISPLACEMENT (m,n) = (1,0)

(m,n) = (1,1)

(m,n) = (2,0)

(m,n) = (2,1)

(m,n) = (3,0)

(m,n) = (3,1)

HIGHER ORDER MODES

RESONANT FREQUENCY BASED PRESSURE SENSOR

BACKGROUND OF THE INVENTION

The present invention relates to pressure transmitters of the type used in industrial process control systems. More specifically, the present invention relates to a pressure sensor for use in a pressure transmitter.

Pressure transmitters are used in industrial process control systems to monitor pressures of process fluids. A pressure transmitter includes a pressure sensor which is coupled to a process fluid and provides an output in response to pressure applied by the process fluid. One well known type of pressure transmitter is the Model 3051 transmitter available from Rosemount Inc. of Chanhassen, Minn. Pressure transmitters are also shown in U.S. Pat. No. 5,094,109, for example.

In many installations where differential pressure is measured, it is frequently also desirable to obtain line pressure measurements (i.e., the pressure of the process fluid in the pipe or conduit) For example, the line pressure can be used for determining mass flow of process fluid, or for other control applications. However, when a line pressure measurement is required in addition to the differential pressure measurement, an additional pressure sensor is typically required. This additional pressure sensor requires additional components and coupling to the process fluid. These additional components lead to increased complexity and expense, as well as increase the likelihood of failure.

Further, many pressure sensing technologies are coupled to process fluid through an isolation arrangement which uses an isolation diaphragm exposed to process fluid and an isolation fill fluid which couples the pressure sensor to the isolation diaphragm. This isolation arrangement may potentially be a source of errors, complexity, and potential failure in process devices.

SUMMARY

A pressure sensor for sensing a pressure of a process fluid includes a sensor body exposed to the pressure of the process fluid. The sensor body deforms in response to the pressure. A diaphragm suspended by the sensor body has a tension which changes in response to deformation of the sensor body. A resonant frequency of the diaphragm is measured. The measured resonant frequency is indicative of the pressure of the line process fluid integrity of the isolation fill fluid system. In addition to measuring the resonant frequency, the oscillation mode itself can be used as a diagnostic tool to assess sensor health.

DETAILED DESCRIPTION

The present invention relates to pressure sensors of the type used in pressure transmitters of industrial process control systems. With the present invention, a pressure sensor is provided which includes a deformable sensor body. A diaphragm is mounted to the sensor body. As the body deforms, the resonant frequency of the diaphragm changes. The resonant frequency can be measured and the applied pressure can be determined.

Figure 1:
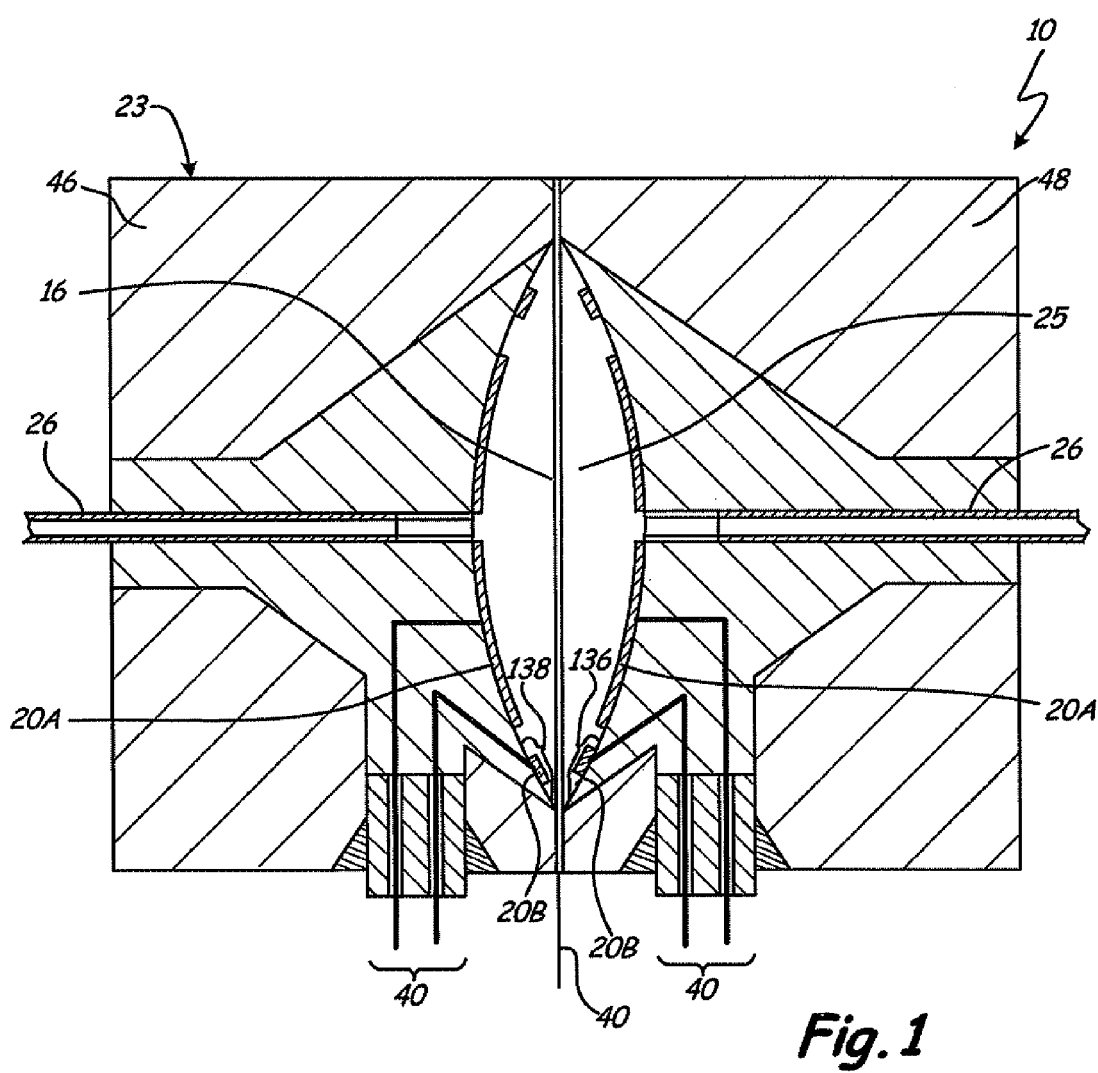
FIG. 1 is a cross-sectional perspective view of a pressure sensor in accordance with the present invention.

FIG. 1 is a perspective cross-sectional view of a differential pressure sensor 10 in accordance with one embodiment of the present invention. Pressure sensor 10 is one example of a differential pressure sensor configuration and includes pressure connectors 26 which extend through sensor body 23. The sensor body is formed of half cells 46 and 48 and comprises a metal and glass composite. A cavity 25 within sensor 10 carries a fill fluid. A moveable diaphragm 16 extends across the cavity 25 and is configured to move in response to an applied differential pressure. Electrodes (capacitor plates) 20A and 20B are arranged in cavity 25 of the sensor 10. Electrical connections 40 coupled to the electrodes 20 and the diaphragm 16 are used to measure electrical capacitance therebetween. This capacitance varies as the diaphragm moves in response to the applied pressure and can be used to determine the applied differential pressure. This differential pressure measurement can be used to determine the flow rate in the pipe or conduit.

In accordance with the present invention, a resonant acoustic transducer 96 (shown in FIG. 3) is coupled to the deformable pressure sensor body 23 of the pressure sensor 10 and is configured to resonate the diaphragm 16, whose frequency changes in response to a line pressure of the process fluid. The electrodes 20A and 20B can function as a resonance pick-up and are described below in more detail.

As differential pressure is applied to the sensor body 23 through pressure connections 26, in addition to movement of the diaphragm 16, the overall shape of the sensor body 23 also changes in response to the line pressure. This deformation in the shape of the sensor body changes the resonant frequency of the diaphragm 16. The resonant frequency of the diaphragm can be measured in accordance with any appropriate technique. For example, an acoustic transducer (source) can be used to resonate the diaphragm 16. The resonant frequency of the diaphragm can then be sent by measuring changes in the capacitance between electrodes 20A and 20B and diaphragm 16.

The following equation is used to predict the resonant frequency of a pre-stressed membrane:

$$f_n = \frac{\lambda_{ij}}{2}\sqrt{\frac{\sigma}{\rho A}} \qquad \text{(Eq. 1)}$$

Where:
$f_n$=membrane natural frequency (Hz)
$\lambda_{ij}$=constant value based on the resonant mode based on nodal radii (i) and nodal diameters (j)
$\sigma$=tension of the center diaphragm (psi)
$\rho$=membrane material property a function of mass, volume and gravitational force (lb-s$^2$/ln$^4$)
A=effective area of the resonating membrane Equation 1 describes a relationship that can be used to calculate the center diaphragm tension by measuring the frequency at which the diaphragm resonates. Simplifying Equation 1 shows that:

$$f_n \sim \sqrt{\sigma} \qquad \text{(Eq. 2)}$$

which states that the resonant frequency of the center diaphragm is proportional to the tension of the square root of the center diaphragm 16.

Figure 2:
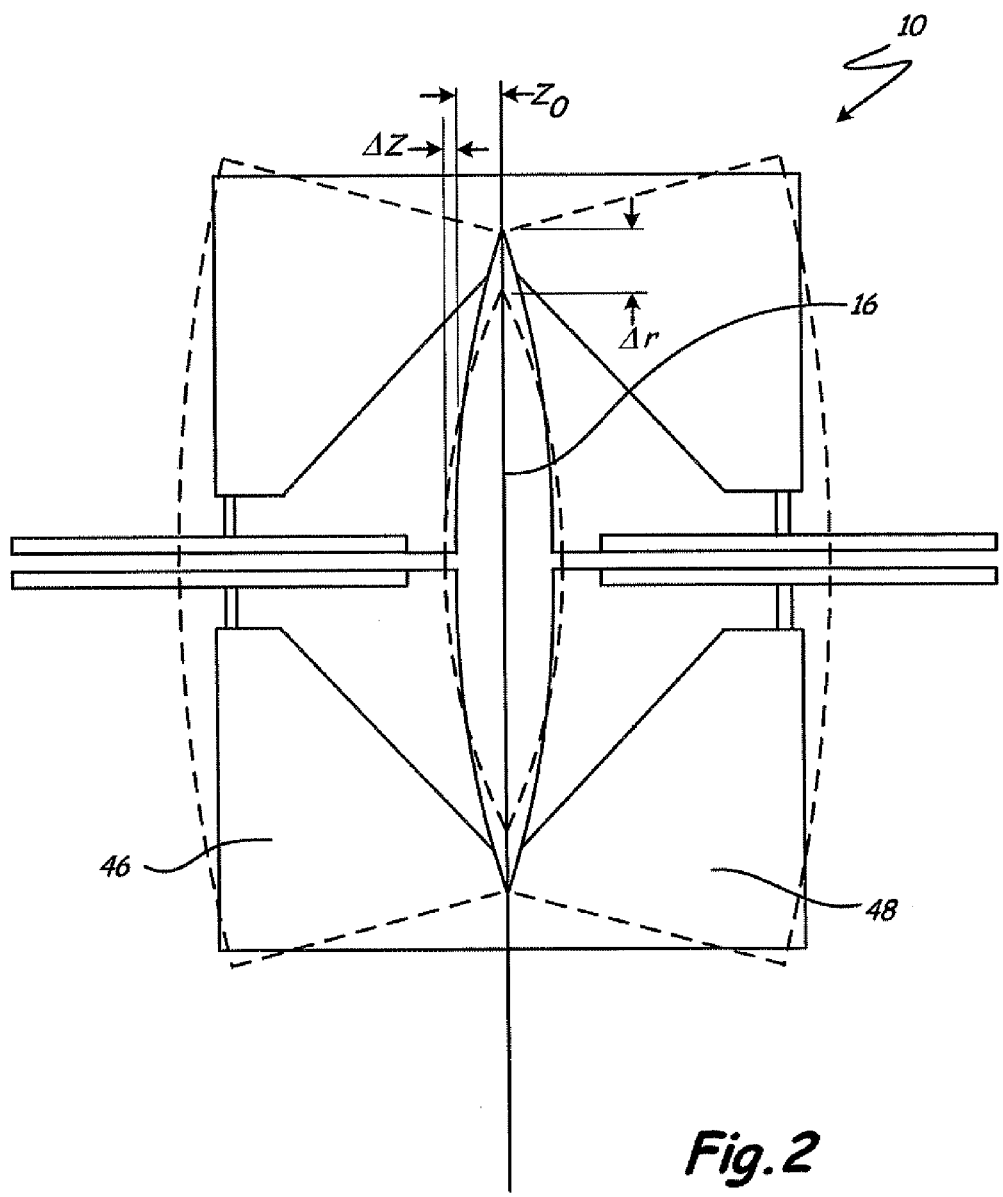
FIG. 2 is a cross-section view showing the pressure sensor of FIG. 1 from the result of a pressure applied to both pressure ports of the sensor of FIG. 1.

FIG. 2 is a simplified cross sectional view of sensor 10 showing the deformation of the body of sensor 10 in response to an applied line pressure from the process fluid. In response to an applied pressure, the cavity depth increases which causes the half cells 46 and 48 to deflect radically inwardly. This results in a reduction in the tension (stress) of the center diaphragm 16. As shown in FIG. 2, the cavity depth ($Z_0$) increases ($\Delta Z$) with increasing line pressure. The deflection follows Hook's law and is directly proportional to the line pressure, P, i.e.:

$$Z = Z_0 + k_z P \quad \text{(Eq. 3)}$$

Where $k_z$, is the spring constant of proportionality between line pressure and cavity depth. Similarly, the radius (r) of the sensor at the center diaphragm (CD) contracts ($\Delta r$) with applied line pressure. This deflection is linear with line pressure (p):

$$r = r_o - k_r P \quad \text{(Eq. 4)}$$

where $k_r$, is the spring constant of proportionality between line pressure and radial changes. Because of this, the CD stress is also a linear function of line pressure:

$$\sigma = \sigma_0 - k_\sigma P \quad \text{(Eq. 5)}$$

where $k_\sigma$ is the spring constant of proportionality between line pressure and center diaphragm stress. Since the CD stress is biaxial, the strain may be converted to stress as follows:

$$\sigma = \frac{E\varepsilon}{1-v} \quad \text{(Eq. 6)}$$

where $$\varepsilon = \text{strain} = \left(\frac{\Delta r}{r}\right), \quad E = \text{Young's Modulus},$$

and v=Poisson's ratio for the CD. Because of this linear proportionality, it may be written:

$$k_\sigma = \left(\frac{E}{1-v}\right)\left(\frac{k_r}{r}\right) \quad \text{(Eq. 7)}$$

Sympathetic resonance is a harmonic phenomenon in which a passive body responds to external vibrations to which it is harmonically similar. Using sympathetic resonance, energy can be transferred and stored between resonance systems. With the present invention, the center diaphragm 16 of the sensor body is sympathetically resonated, for example, by an acoustic source. The center diaphragm is brought into resonance acoustically or mechanically and the resonance frequency is measured to determine line pressure. The resonant frequency can also be used to diagnose the integrity of the center diaphragm, as well as the isolation diaphragms and pressure connectors which are filled with oil and used to isolate the sensor from process fluid.

The center diaphragm will resonate at a specific frequency based on its tension. Factors influencing center diaphragm tension include line pressure, differential pressure and temperature. As differential pressure and temperature are measured in the device, their contribution to changes in diaphragm tension can be characterized and therefore their effects compensated. With this, only line pressure remains as an unknown and its frequency contribution value can be calculated as illustrated by Equation 8:

$$f_{LP} = f_{measured} - f_{DP} \pm f_{temperature} \quad \text{(Eq. 8)}$$

Differential pressure will add tension (and increase the resonant frequency) as the center diaphragm is displaced from its neutral axis. Sensor temperature will either increase or reduce tension on the center diaphragm as the materials expand or contract.

For a practical sensor based on a resonant diaphragm, the issue of media damping becomes important. When the diaphragm is surrounded by a liquid, such as the isolation oil in a typical application, the diaphragm's resonant behavior will be severely damped. This occurs because the oil, for example must be physically displaced in order for the diaphragm to vibrate. This problem can be mitigated by several means: One is to use the sensor in a gas medium which will have a reduced effect on the diaphragm damping. In some applications, however, this is not feasible and a liquid, typically oil must be in contact with the diaphragm.

Figure 5A:
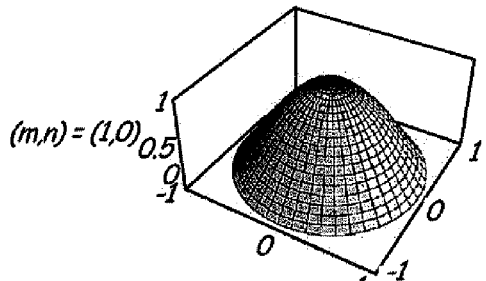
FIGS. 5A-5F illustrate example resonant modes of a center diaphragm in accordance with the invention.

To circumvent this, a second approach can be employed. Higher order resonant modes of the diaphragm tend to have many undulations in the stretched diaphragm membrane, and typically have lower displacement amplitudes. This reduces the net volume displacement and consequently the damping of the mode shown in FIG. 5C is less severe than that occurring for the mode shown in FIG. 5A.

Figure 5D:
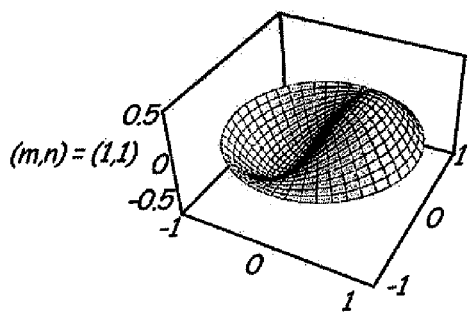
Figure 5B:
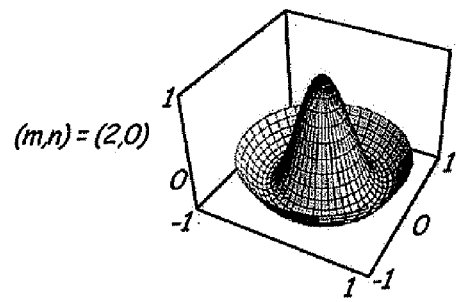
Figure 5E:
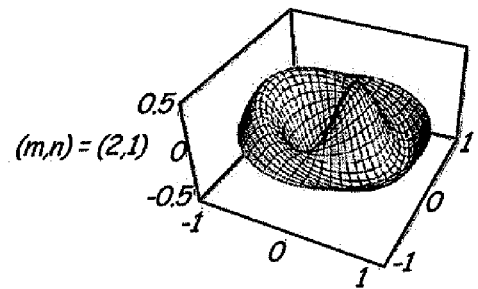
Figure 5C:
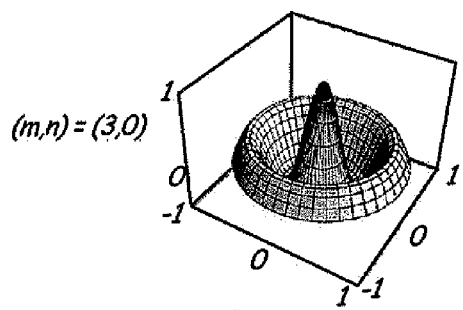
Figure 5F:
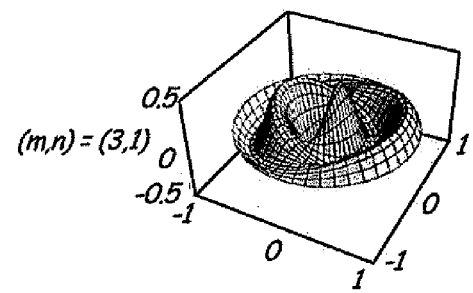

An even more effective third method is to only excite so-called "azimuthally asymmetric" modes shown in FIGS. 5D-F. These particular modes have the advantage of not displacing any net volume because upward displacements are countered by equal downward displacements.

Hence, for minimal resonance damping when the diaphragm is in contact with a liquid, highest order azimuthally asymmetric modes should be considered.

As a diagnostic took, the particular mode that is excited may also change if some aspect of the sensor has changed, and consequently if detected, would indicate a potential fault in the sensor.

Figure 3:
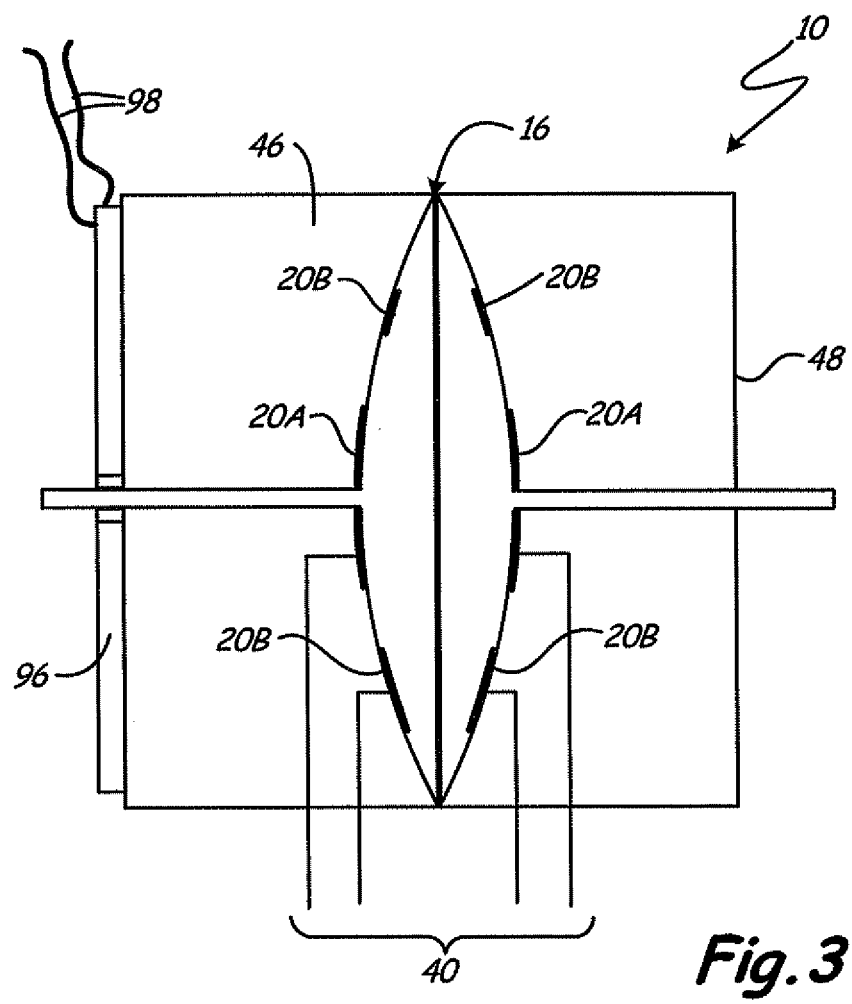
FIG. 3 is a cross-sectional view of a pressure sensor including an acoustic source.

FIG. 3 is a cross sectional view of pressure sensor cell 10. In FIG. 3, the electrodes 20 are illustrated as center electrodes 20A and ring electrodes 20B. These electrodes couple to electrical connections 40. An acoustic transducer 96 is illustrated mounted to one of the half cells 46 and is used to apply an acoustic signal to the center diaphragm 16. The acoustic transducer 96 couples to wires 98 and is driven to a frequency, or swept across a range of frequencies, in order to excite the center diaphragm into resonance. This resonance can be detected by measuring the variations in the capacitance between electrodes 20A/B and center diaphragm 16. Although in this example capacitance is illustrated as being used to detect the deflection of the center diaphragm 16 due to resonance, other techniques may also be used. These include acoustic, optical, mechanical or other sensing techniques.

Figure 4:
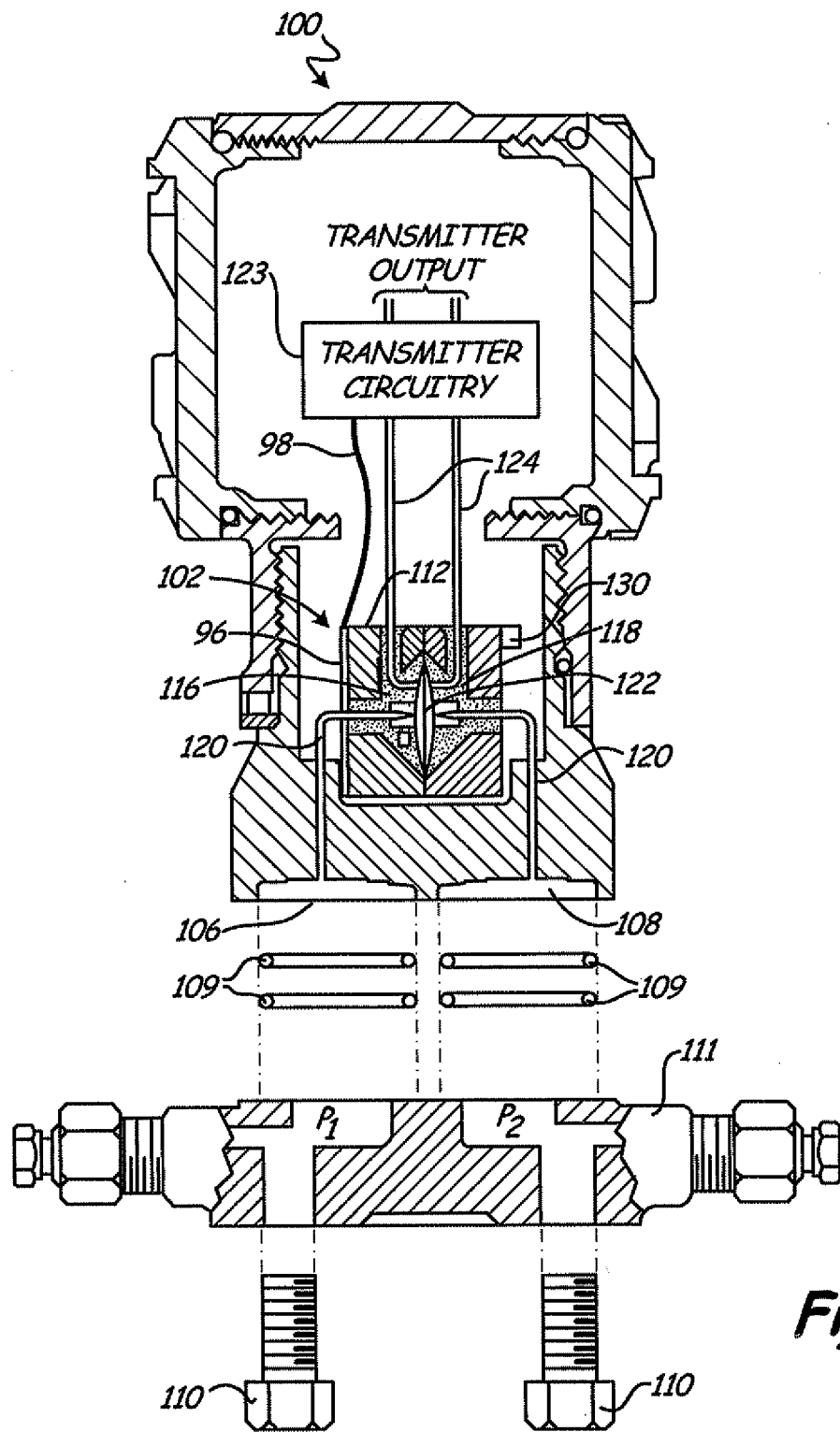
FIG. 4 is a cross-sectional view of a process variable transmitter including a pressure sensor in accordance with the present invention.

FIG. 4 is a cross-sectional view of a transmitter 100 including a pressure sensor 102 in accordance with an embodiment of the present invention with acoustic transducer 96. Transmitter 100 is known in the industry as having a Coplanar™ platform and isolation diaphragms 106 and 108 are aligned generally in the same plane. Flange 111 couples to transmitter 100 through bolts 110 to thereby couple pressure $P_1$ and $P_2$ to isolation diaphragms 106 and 108. Gaskets 109 provide a seal between flange 111 and isolation diaphragm 106, 108. A substantially incompressible fluid is carried in pressure connectors 120 which couple to pressure sensor 102. Similar to pressure sensor 10, sensor 102 has a sensor body which is formed from two half cells 112, 114 filled, respectively, with glass material 116, 118. Electrical conductors 124 couple to capacitor plates (not shown) which are carried on sensor surfaces of brittle materials 116, 118. A diaphragm 122 deflects in response to applied pressures $P_1$ and $P_2$ causing a capacitive change which is detected by transmitter circuitry 123 which provides an output related to pressures $P_1$ and $P_2$ over a process control loop. The process control loops are can be in accordance with any appropriate standard including two wire process control loop such as a 4-20 mA current loops, HART® or FieldBus based control loops, wireless loop, etc. Additionally, the process control loop can comprise a wireless control loop in which wireless communication techniques are used to transmit data.

In addition to determining line pressure based upon the resonance of the center diaphragm as discussed above, the resonant frequency and mode type can also be used to determine the condition of the center diaphragm as well as the oil fill system. Transmitter circuitry 123 provides diagnostic circuitry and couples to acoustic transducer 96 through wires 98. Circuitry 123 is configured to energize transducer 96 and responsively sense the resonant frequency of diaphragm 122 as discussed above. Circuitry 123 can provide a diagnostic output for example over the transmitter output. Damage to the center diaphragm, or the occurrence of oil leaks, will result in changes in the resonance frequency of the center diaphragm. Although measurement of resonance is illustrated as being based upon changes in capacitance, other measurement techniques may be employed such as the use of acoustic, optical, mechanical, or other sensing techniques. The measured resonance frequency can be compensated based upon the measured differential pressure and temperature as desired to improve accuracy of the measurements. If temperature compensation is desired, a temperature sensor 130 can be thermally coupled to the pressure sensor 102 as illustrated in FIG. 4. The temperature sensor 130 can be in accordance with any appropriate sensor technology and coupled to circuitry 123. Shifts in the resonance frequency of the center diaphragm 122 may be indicative of physical damage such as a hole, a pierced or torn diaphragm, or other damage to the diaphragm or transmitter components. Loss of oil pressure on one or more sides of the diaphragm will also cause a change in resonant frequency. In one configuration, differential pressure measurements may also be obtained using a pre-stressed membrane, an acoustic transducer (source) and an acoustic pickup. The measurement of resonance of the isolation diaphragm can be used to determine integrity of the isolation diaphragm and is indicative of line pressure. Diaphragm resonance can also be induced using electrostatic techniques. In another example, the energy source used to place the center diaphragm into resonance is positioned at a location external to the transmitter. For example, a testing device can be configured to couple to the transmitter and transmit acoustic energy into the transmitter thereby placing the diaphragm into resonance.

Although the above description has discussed the sensor body as being a glass and metal composites, other material can be used which have desirable characteristics. Examples include plastics or the like. Any appropriate technology for sensing resonance can be used such as capacitance, strain gauge, optical techniques, silicon techniques, etc. Further, multiple sensors can be used for safety, redundancy, self-validation or the like. As used herein, "resonant frequency sensor" can comprise any appropriate sensor technology used to measure or sense the resonant frequency of the center diaphragm. In the figures shown herein, the resonant frequency sensor is illustrated as an acoustic source and a separate displacement sensor which measures displacement of the center diaphragm based upon electrical capacitance. However, the present invention is not limited to this particular resonant frequency sensor.

What is claimed is:

1. A pressure sensor for sensing a pressure of a process fluid, comprising:
    a deformable sensor body exposed to the pressure of the process fluid and having a cavity formed therein which receives a differential pressure, wherein the sensor body deforms in response to a line pressure;
    a diaphragm suspended in the cavity of the sensor body and having a tension which changes in response to deformation of the sensor body, the diaphragm flexing in response to the differential pressure;
    a resonant frequency sensor configured to sense a resonant frequency of the diaphragm, the resonant frequency indicative of the line pressure of the process fluid; and
    a deflection sensor configured to sense deflection of the diaphragm which is indicative of the differential pressure.

2. The apparatus of claim 1 wherein the deformable sensor body comprises a glass and metal sensor body.

3. The apparatus of claim 1 wherein the resonant frequency sensor includes an acoustic source.

4. The apparatus of claim 3 wherein the resonant frequency sensor further comprises a capacitor plate positioned proximate the diaphragm having a capacitance which changes in response to deflection of the diaphragm.

5. The apparatus of claim 1 including a temperature sensor and wherein resonance of the diaphragm is compensated based upon a sensed temperature.

6. The apparatus of claim 1 wherein the deflection sensor comprises an electrode positioned proximate the diaphragm and wherein measurement circuitry is configured to measure the differential pressure based upon a change in capacitance between the electrode and the diaphragm.

7. The apparatus of claim 6 wherein resonance of the diaphragm is sensed by the measurement circuitry based upon the capacitance between the electrode and the diaphragm.

8. The apparatus of claim 1 wherein the resonant frequency is further indicative of a diagnostic condition of the pressure sensor.

9. The apparatus of claim 1 wherein the resonant frequency mode is indicative of the health of the sensor.

10. The apparatus of claim 1 wherein the pressure sensor couples to a process fluid through an isolation fluid.

11. A process control transmitter including transmitter circuitry coupled to a pressure sensor for sensing a pressure of a process fluid, comprising: a deformable sensor body exposed to the pressure of the process fluid and having a cavity formed therein which receives a differential pressure, wherein the sensor body deforms in response to a line pressure; a diaphragm suspended in the cavity of the sensor body and having a tension which changes in response to deformation of the sensor body, the diaphragm flexing in response to the differential pressure; a resonant frequency sensor configured to sense a resonant frequency of the diaphragm, the resonant frequency indicative of the line pressure of the process fluid; and a deflection sensor configured to sense deflection of the diaphragm which is indicative of the differential pressure.

12. The process control transmitter of claim 11 wherein the transmitter circuitry is configured to determine line pressure based upon the resonant frequency of the diaphragm.

13. A method of sensing pressure of a process fluid, comprising:

applying a differential pressure of the process fluid to a cavity formed in a sensor body and thereby deforming the sensor body in response to a line pressure;

suspending a diaphragm in the cavity, the diaphragm having a tension which changes in response to deformation of the sensor body, the diaphragm further deflecting in respond to the differential pressure;

sensing a resonant frequency of the diaphragm, the resonant frequency indicative of the line pressure of the process fluid;

sensing deflection of the diaphragm indicative of the differential pressure;

providing a line pressure output indicative of line pressure of process fluid based upon sensed resonant frequency of the diaphragm; and providing a differential pressure output indicative of the differential pressure based upon the sensed deflection of the diaphragm.

14. The method of claim 13 wherein resonant frequency is measured based upon a capacitance.

15. The method of claim 13 including exciting the diaphragm into resonance using an acoustic source.

16. The method of claim 13 including sensing the deflection of the diaphragm using capacitance.

17. The method of claim 13 including determining a diagnostic condition of the diaphragm based upon the sensed resonant frequency.

18. The method of claim 13 including determining a diagnostic condition of the diaphragm based upon the sensed resonant frequency mode.

19. The method of claim 13 including transmitting information related to pressure of the process fluid on a process control loop.

* * * * *